May 12, 1970     A. DARROW     3,511,734
METHOD OF LINING CONCRETE PIPE
Original Filed Nov. 11, 1963     2 Sheets-Sheet 1

INVENTOR
*Arnold Darrow*
BY *Meyer, Tilberry & Body*
ATTORNEYS

May 12, 1970     A. DARROW     3,511,734
METHOD OF LINING CONCRETE PIPE

Original Filed Nov. 11, 1963     2 Sheets-Sheet 2

INVENTOR
Arnold Darrow

BY *Meyer, Tilberry & Body*

ATTORNEYS

United States Patent Office
3,511,734
Patented May 12, 1970

3,511,734
METHOD OF LINING CONCRETE PIPE
Arnold Darrow, Dallas, Tex., assignor to Cee-Bee Manufacturing Company, Inc., a corporation of New York
Original application Nov. 1, 1963, Ser. No. 321,393, now Patent No. 3,381,718, dated May 7, 1968. Divided and this application Apr. 29, 1968, Ser. No. 739,597
Int. Cl. F16l 9/14
U.S. Cl. 156—287    5 Claims

ABSTRACT OF THE DISCLOSURE

A method for lining concrete pipe with vinyl plastic sheet material using an epoxy resin bonding agent. A laminated liner is first formed comprising a plurality of plies of the vinyl plastic sheet and an outer ply of a fabric backing material having a greater bonding affinity for the epoxy resin bonding agent than the vinyl plastic material. The laminated liner is positioned over an expandable form, which is then inserted with the liner thereon into the bore of the concrete pipe. A layer of epoxy resin is established between the liner and the bore of the concrete pipe, and the form is expanded to press the liner against the pipe. The pressure and temperature within the form are regulated to cure the epoxy resin.

---

Figure 1:
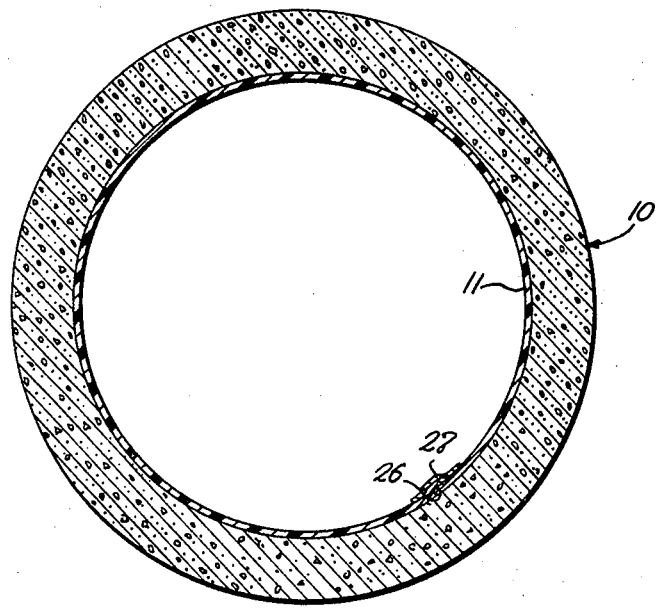

This is a division of application Ser. No. 321,393, filed Nov. 1, 1963, now Pat. No. 3,381,718, which in turn is a continuation-in-part of application Ser. No. 187,616, Apr. 16, 1962, now abandoned.

The present invention relates, in general, to concrete pipe, and more particularly to concrete pipe especially for sewers, having a lining of material which is resistant to corrosive action of gases, acids and alkali to which the pipe is exposed and methods for forming the same.

Pipes used for conveying sewage and industrial waste, especially where large capacity is required, are customarily formed of concrete as this is the most economical readily available material. The use of concrete pipe presents serious difficulties in connection with transportation of sewage and wastes because of corrosive action or attack by the liquids or gases conveyed. This is particularly true where ordinary sewage is conveyed, as the hydrogen sulfide present converts into sulfuric acid which eats into the concrete pipe.

Linings have heretofore been provided for concrete pipe wherein the linings are applied as a continuous coating or liner plate or a plurality of liner plates. In the case of surface coatings or plastic liner materials which have heretofore been tried, problems have arisen in successfully providing a strong and lasting bond between the lining and the wall of the concrete pipe and in providing a truly impervious corrosion resisting surface. As a result, many of the lining materials heretofore used failed to prevent infiltration of the corrosive gases or liquids to the concrete surface and the imperfect bond between the lining and the concrete surface has resulted in cracking of the lining and scaling off of the lining material. Where a plurality of liner plates were used, it has been difficult to secure a perfect bond between adjacent plates such as would prevent infiltration of the corrosive gases and liquids to the concrete surface and great expense has been involved in the use of liner plates to protect the concrete pipe surface.

An object of the present invention therefore, is the provision of a novel lined concrete pipe which is resistant to corrosive action of gases and liquids to be carried thereby.

Another object of the present invention is the provision of simple and economical methods of lining concrete pipe with a protective lining of plastic sheet material which is resistant to corrosive materials such as acids and alkali, wherein the lining is securely bonded uniformly throughout its extent to the inner surface of the concrete pipe.

Another object of the present invention is the provision of economical and effective methods of placing plastic lining sheet material against the surface of a concrete pipe and uniformly bonding the same throughout to the concrete surface of the pipe.

Yet another object of the present invention is the provision of concrete pipe having a lining of vinyl plastic sheet material securely bonded throughout to the inner concrete surface, wherein the lining is constructed in such a way that seepage of corrosive gases or liquids through pin holes customarily found in commercially produced vinyl plastic sheet material is prevented.

Other objects, advantages and capabilities of the present invention will become apparent from the following detailed description, taken in conjunction with the accompanying drawings illustrating preferred embodiments of the invention.

A construction designed to carry out the invention will be hereinafter described, together with other features of the invention.

Figure 2:
Figure 3:
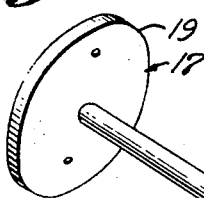
Figure 4:
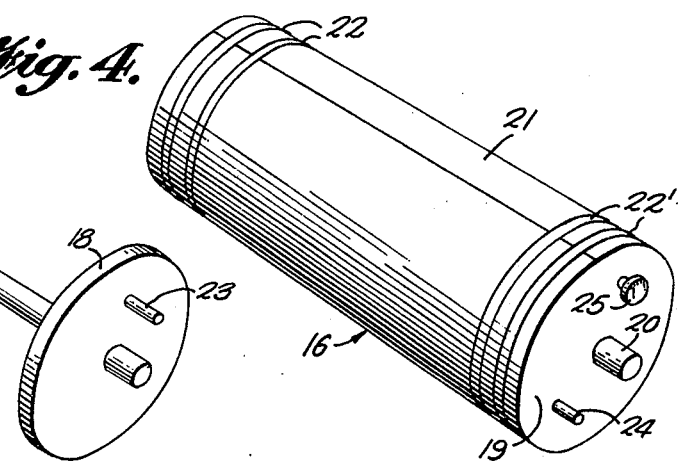
Figure 5:
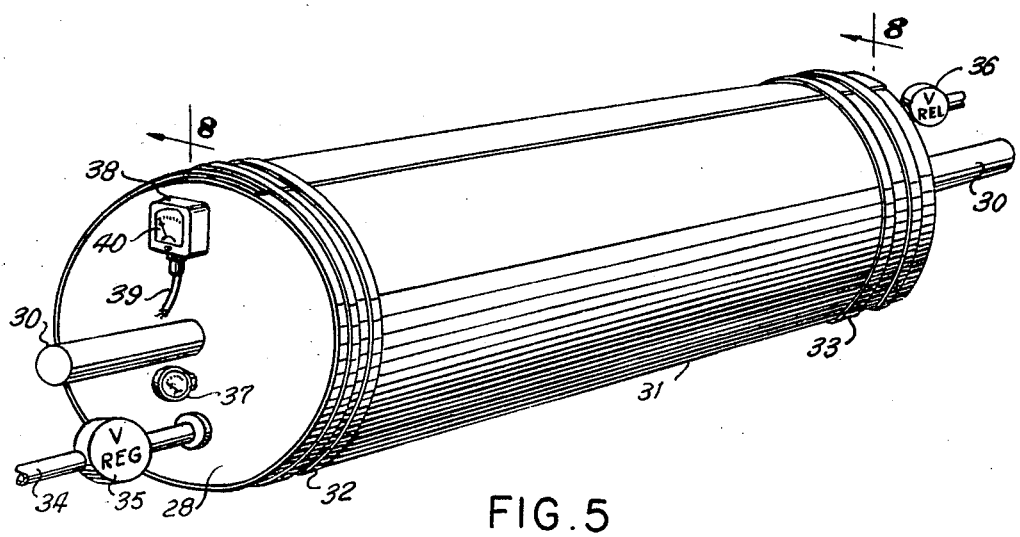
Figure 8:
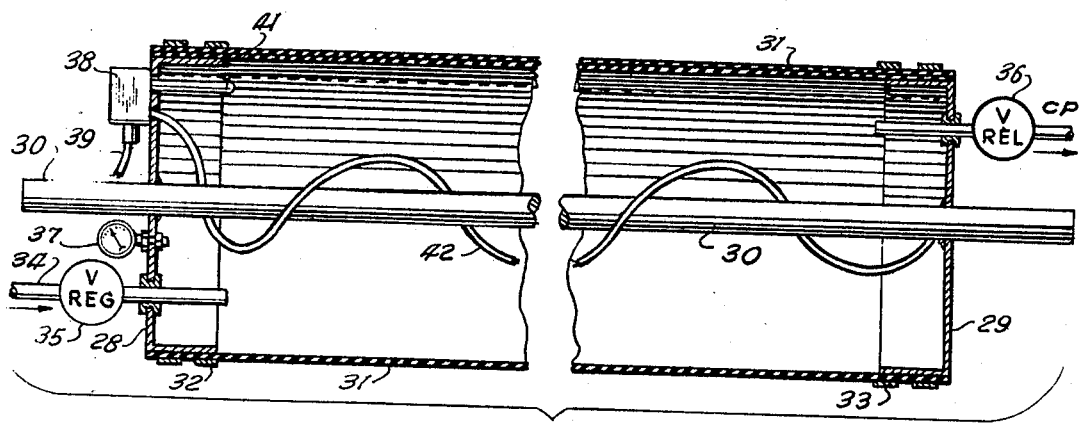
Figure 6:
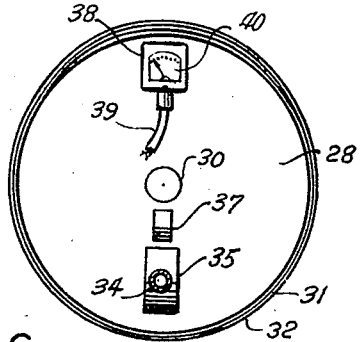
Figure 7:
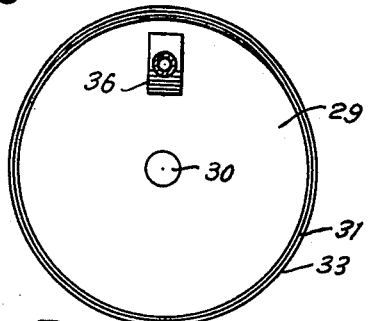

The invention will be more readily understood from a reading of the following specification and by reference to the accompanying drawings, wherein examples of the invention are shown, and wherein:

FIG. 1 is a vertical, transverse sectional view through a concrete pipe having a lining embodying the present invention, FIG. 2 is a fragmentary, enlarged, vertical, sectional view of the lining material in place in the concrete pipe, FIG. 3 is a perspective view of a cylinder head assembly used in forming the concrete pipe lining in accordance with one method of applying the same, FIG. 4 is a perspective view of an inflatable cylinder assembly comprising an inflatable sleeve assembled on the cylindrical head assembly illustrated in FIG. 3, FIG. 5 is a view in perspective of a cylinder head and heater assembly for carrying out a preferred method of applying the lining, FIG. 6 is an end elevational view of one end of the assembly of FIG. 5, FIG. 7 is an end elevational view of the opposite end of the assembly of FIG. 5, and FIG. 8 is a longitudinal, sectional view of the assembly of FIG. 5 showing the inflatable sleeve secured thereto.

The present invention, in general, involves the provision of a plastic liner adhered to the inside surface of a concrete pipe to protect the concrete surface against corrosive action of gases or liquids to be carried thereby, wherein the liner comprises two or more plies of a plastic sheet material such as polyvinyl chloride or the like securely bonded together and bonded to a ply of backing material which displays the property of being susceptible to vary secure bonding to concrete by a bonding agent so as to bond the vinyl plastic material intimately to the concrete. This laminated liner of vinyl material and backing material is bonded to the concrete pipe by draping the lining material over an inflatable pneumatic tube assembly which is smaller than the diameter of the concrete pipe, applying an adhesive bonding composition either to the backing of the lining material or to the concrete or both, and inserting the pneumatic tube with the lining material draped thereon into the pipe and inflating the tube with sufficient pressure to secure complete contact of the lining material with the interior surface of the concrete. Heat is supplied to the interior of the pneumatic tube to maintain a suitable curing temperature in the zone of the bonding material and effect a thorough bonding of the lining to the concrete surface.

Referring now to the drawings, wherein like reference characters designate corresponding parts throughout the several figures, a section of concrete pipe 10 such as is diagrammatically illustrated in FIG. 1 is lined along the interior surface thereof over either a portion of the interior surface or the entire interior surface with a lining material indicated at 11. This lining material 11 in the preferred embodiment includes a top layer 12 of plastic material, such as a ten mil ply of high molecular weight polyvinyl chloride sheet plastic, a middle layer 13 of similar material, such as another ten mil ply of high molecular weight polyvinyl chloride sheet plastic and a bottom layer 14 of a material which may be bonded very securely to the polyvinyl chloride as well as to the concrete surface of the pipe 10. In the preferred example, this bottom layer or backing layer may be a fabric formed of cotton, although fabrics of glass or other known materials have been found to be suitable. This laminated body of lining material may be manufactured by any known commercial method of manufacture, such as by coating, calendaring, laminating or the like. Any of these methods of forming the laminated lining is acceptable as long as it results in a product that secures the three layers together so that they cannot be readily separated. This body of lining material is to be adhesively bonded to the inner surface of the concrete pipe 10 by suitable adhesives, such for example, as epoxy compounds. The adhesive material should be of 100% solid material with no volatile matter or solvent that can be trapped between the lining and the concrete surface. The coating of bonding material is indicated in the drawings by the reference character 15.

In order to secure a strong uniform adhesive bond between the lining material 11 and the surface of the concrete pipe 10, an inflatable cylinder assembly 16 is preferably used to press the lining material tightly against the concrete surface. The inflatable cylinder assembly 16 in the embodiment illustrated in FIGS. 3 and 4 is composed of core unit 17 formed of two cylindrical heads or end members 18, 19 of slightly smaller diameter than the inner diameter of the pipe 10 which are joined together by a central pipe, shaft or other support member 20. Extending over and covering the head members 18, 19 of the core unit 17, a sleeve 21 of inflatable material is formed as by wrapping the same about the peripheries of the head members 18, 19, the inflatable material being, for example, polyvinyl chloride sheet, rubber or other flexible sheeting material. This sleeve 21 is tightly secured to the heads 18, 19 of the core unit 17 by straps 22 which overlie the sleeve of inflatable material and tightly bind the same against the peripheries of the heads 18, 19. The head 18 on one end of the core unit is formed with a pipe fitting 23 to provide an inlet for emission of steam into the interior of the inflatable cylinder assembly 16. The opposite head 19 is provided with a pressure relief valve 24 set to maintain a constant pressure within the cylinder 16, for example a pressure of 5 to 10 p.s.i., and if desired, a thermometer 25.

In practicing the method of preparation of the lined concrete pipe in accordance with the present invention, the surface of the concrete pipe 10 to be lined must first be cleaned and freed of loosely adhering materials, as by sandblasting the interior surface. The lining material 11 is then cut to the desired length and width depending on the diameter and length of the pipe, and is wrapped around the head members 18, 19 of the core unit 17 and loosely secured at the ends or heads. The lining material 11 is placed with the bottom layer of fabric layer 14 exposed. A coating of the adhesive bonding material, such as one of the commercially available epoxy adhesive compounds, is applied to the fabric layer 14 of the lining material 11 or if desired, is applied to the interior surface of the concrete pipe 10 or to both surfaces. The inflatable cylinder assembly 16, which is preferably about two inches smaller in diameter than the diameter of the concrete pipe is placed in the pipe with the heads 18, 19 of the cylinder supporting the cylinder assembly within the pipe. Steam is then connected to the inlet pipe fitting 23 and introduced into the interior of the inflatable cylinder assembly 16. The steam maintains a temperature within the cylinder of about 180° F. to 210° F. The incoming steam is preferably at a pressure of about 10 to 15 p.s.i., and since only 5 to 10 p.s.i. pressure is maintained in the cylinder 16 by reason of the setting of the pressure relief valve 24, a constant flow of steam through the cylinder 16 is maintained during operation. The introduction of steam under pressure into the cylinder 16 inflates the flexible cover or sleeve 21, causing the lining material 11 to be automatically rolled onto the interior surface of the concrete pipe 10 from the bottom toward the top of the pipe, the weight of the cylinder assembly 16 being sufficient to continuously maintain the bottom zone of the lining material on the cylinder in contact with the bottom zone of the concrete pipe surface. This action aids in preventing any air pockets from being trapped under the lining. The cylinder assembly 16 is left in the pipe 10 under this steam pressure until the adhesive bonding composition is fully cured, which in practice involves a curing period of from thirty minutes to one hour.

The cylinder assembly 16 is then deflated and removed from the interior of the pipe 10, leaving the lining 11 securely bonded to the concrete.

It will be apparent that the lining material may either be formed over the entire inside perimeter of the pipe, or only over the portion thereof lying above a certain level, for example, over a circumferential range of about 300°. In the case where the entire inside perimeter of the pipe is to be lined, the lining material 11 is preferably made larger than the inside perimeter to allow a small lap joint of about one to two inches in width, indicated at 26 in FIG. 1. This lap joint is then sealed by heat sealing a strip of polyvinyl chloride, or other material identical in nature to the top layer, over the seam to completely seal the lining, as indicated at 27. The lining material may be made three to four inches longer than the length of the pipe in order to leave enough material to lap the succeeding joints, or may terminate flush with the ends of the pipe and be sealed with separate strips. These laps or seams are then heat sealed in the same manner described above.

It will be apparent that lining material of the above described construction applied in the manner hereinbefore set forth may also be used for pipe of other material, such as steel, and the like, wherein difficulty may be experienced in achieving a secure, uniform bond between the polyvinyl chloride lining and the surface of the pipe, and that other adhesive compositions which are well known in the art for securing bonding between the backing layer and the pipe material may be used so long as the backing material is securely fixed to the polyvinyl chloride layer.

A preferred structure for bonding the resinous lining to the interior wall of the concrete pipe is illustrated in FIGS. 5–8 and includes a pair of flanged end heads or plates 28 and 29 suitably joined by an axial tube or rod 30. An elongate tubular sleeve 31, formed of rubber or some other suitable material, has its end portions secured or clamped to the end heads 28 and 29 by encompassing bands 32 and 33 or in any other suitable or desirable fashion.

An air conductor 34, leading from a suitable source of air or other fluid under pressure, is connected through an adjustable, constant pressure output pressure regulator 35 and through the head 28 into the interior of the sleeve 31, while a suitable pressure relief valve 36 is connected into the interior of the sleeve 31 through either of the heads 28 and 29. A pressure gauge 37 may also be connected through the head 28 which, in addition, carries a suitable electrical thermostat 38 having connected thereto power supply leads 39 and carrying the usual temperature gauge or dial 40. The thermostat has a temperature sensing probe 41 extending interiorly of the sleeve 31 and controls heating within the sleeve 31 by an elongate, helical, electrical or infrared heating coil 42 encompassing the rod 30. It is noted that the tube or rod 30 projects outwardly beyond each of the heads 28 and 29.

In the use of this preferred structure for carrying out the invention, the lining sheet comprising the laminated pair of resin sheets and the cloth or backing material bonded thereto, is cut to size and shape and secured loosely over the exterior of the sleeve 31. The interior of the concrete pipe is cleaned as before by sandblasting or in any other suitable manner and coated with a suitable adhesive such as one of the epoxy resins. The backing sheet or material of the laminated liner is also coated, and the assembly of FIG. 5, carrying the liner, is inserted in the concrete pipe. It is desirable that the assembly be elevated slightly by means of the projecting ends of the rod 30 so as to be placed slightly off-center with respect to the concrete pipes and have line contact therewith in the upper portion of the pipe.

Now the pressure within the sleeve 31 is raised to a level of the order of magnitude of 3 to 5 pounds per square inch by admission of air under pressure or other suitable pressurizing fluid, and the heating element 42 is energized, being regulated by the thermostat 38 to provide an interior temperature within the sleeve 31 of 125° to 150° F. As the sleeve 31 expands, there will be a rolling action pressing the liner successively from the upper portion of the pipe toward the lower portion thereof, thus eliminating bubbles, allowing trapped air to escape through the ends of the sleeve 31 as well as possibly outwardly through the wall of the concrete pipe. The application of pressure and heat is continued, of course, until the layer or layers of adhesive are thoroughly cured and the bonding is complete, after which the sleeve 31 is deflated and the assembly removed.

As previously described, the liner may desirably have a lap joint, which may be heat sealed or welded as well as cementitiously joined, and desirably, a sealing strip of flexible resin or some other suitable material is heated welded the length of the joint.

It is noted that various resinous sheet materials may be utilized for forming the two inner plies of the liner, and that various bonding layers such as cotton fabric, glass fabrics, and other materials exhibiting good bonding qualities to both the concrete and the resin sheets may be employed as the third or outside lamination. The sheets of plastic or resinous material are relatively thin and may have minute pin holes extending therethrough. For this reason, the two inner sheets of resin are employed so that the pin holes of one will be sealed off by the imperforate portions of the other.

In view of the foregoing, it is apparent that the invention contemplates the simultaneous application of heat and pressure within the elastic sleeve 31 or the sleeve 21 regardless of the source of such heat and such pressure, and utilizes the heat and pressure to securely and permanently bond and seal the liner in intimate relationship with the inner wall of the concrete pipe.

While but two preferred examples of the present invention have been particularly shown and described, it is apparent that various modifications may be made therein within the spirit and scope of the invention.

What I claim and desire to secure by Letters Patent is:

1. The method of lining concrete pipe with plastic sheet material which comprises the steps of
   cleaning the inside surface of the pipe,
   applying a liner sheet formed of a plurality of plies bonded together into a laminated sheet including at least a pair of plies of vinyl plastic sheet material which is resistant to corrosive action of oxidized hydrogen sulfide and a ply of fabric backing material having a greater bonding affinity for an epoxy resin bonding agent than said vinyl plastic material in covering relation to an inflatable hollow form having a flexible expandable cylindrical periphery and a slightly smaller diameter that the inner diameter of said pipe,
   the liner being arranged with the ply of fabric backing material facing radially outwardly when the liner is disposed on said form,
   coating the ply of fabric backing material with an epoxy resin bonding agent,
   inserting the form with the liner assembled thereon within the bore of the concrete pipe,
   inflating said form to press the covering liner radially outwardly against the inside surface of the pipe while applying heat, and
   regulating the pressure and temperature within said form to provide selected pressure and temperature conditions for a sufficient period of time to cure said epoxy resin bonding agent.

2. The method of lining concrete pipe with plastic sheet material which comprises the steps of
   cleaning the inside surface of the pipe,
   coating the inside surface of the pipe with an epoxy resin bonding agent,
   applying a liner sheet formed of a plurality of plies bonded together into a laminated sheet including at least a pair of plies of vinyl plastic sheet material which is resistant to corrosive action of oxidized hydrogen sulfide and a ply of fabric backing material having a greater bonding affinity for said epoxy resin bonding agent than said vinyl plastic material in covering relation to an inflatable hollow form having a flexible expandable cylindrical periphery and a slightly smaller diameter than the inner diameter of said pipe,
   the liner being arranged with the ply of fabric backing material facing radially outwardly when the liner is disposed on said form,
   inserting the form with the liner assembled thereon within the bore of the concrete pipe,
   inflating said form to press the covering liner radially outwardly against the inside surface of the pipe while applying heat, and
   regulating the pressure and temperature within said form to provide selected pressure and temperature conditions for a sufficient period of time to cure said epoxy resin bonding agent.

3. The method of lining concrete pipe with plastic sheet material which comprises the steps of
   cleaning the inside surface of the pipe,
   applying a liner formed of a plurality of plies bonded together into a laminated sheet including at least a pair of plies of vinyl plastic sheet material which is resistant to corrosive action of oxidized hydrogen sulfide and a ply of fabric backing material in covering relation to a radially expandable hollow cylindrical form having a slightly smaller diameter than the inner diameter of said pipe,
   the liner being arranged with the ply of fabric backing material exposed outwardly when the liner is disposed on said form,
   providing a coating of epoxy resin bonding agent which cures under heat and pressure between the inside surface of the pipe and the fabric backing material of said liner,
   inserting the form with the liner assembled thereon within the bore of the concrete pipe,
   radially expanding the form to press the covering liner radially outwardly against the inside surface of the pipe while applying heat, and
   regulating the pressure and temperature within said form to provide selected pressure and temperature conditions for a sufficient period of time to cure said bonding agent.

4. The method of lining concrete pipe as set forth in claim 3 wherein the selected pressure and temperature conditions are provided by the admission of steam under pressure into the said form.

5. The method of lining concrete pipe as set forth in claim 3 wherein the fluid introduced under pressure into the form is air under pressure, and the heat is applied electrically from within the form.

References Cited
UNITED STATES PATENTS

| | | | |
|---|---|---|---|
| 2,070,888 | 2/1937 | Eschenbrenner | 138—153 X |
| 2,312,993 | 3/1943 | Stephens | 156—287 X |
| 2,493,153 | 1/1950 | Martin | 25—38 X |
| 2,516,242 | 7/1950 | Munger | 156—391 X |
| 3,080,269 | 3/1963 | Pollock et al. | 156—287 X |
| 3,340,115 | 9/1967 | Rubenstein | 156—294 X |

JOHN T. GOOLKASIAN, Primary Examiner

JOSEPH C. GIL, Assistant Examiner

U.S. Cl. X.R.

138—141; 156—229, 294; 264—269, 314